US009605641B2

(12) United States Patent
Courtiel

(10) Patent No.: US 9,605,641 B2
(45) Date of Patent: Mar. 28, 2017

(54) METHOD FOR COLD STARTING A SPARK-IGNITION INTERNAL COMBUSTION ENGINE OPERATING WITH A FUEL COMPRISING ETHANOL

(71) Applicants: CONTINENTAL AUTOMOTIVE FRANCE, Toulouse (FR); CONTINENTAL AUTOMOTIVE GmbH, Hannover (DE)

(72) Inventor: Claude Courtiel, Vieillevigne (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 196 days.

(21) Appl. No.: 14/267,107

(22) Filed: May 1, 2014

(65) Prior Publication Data
US 2014/0331968 A1 Nov. 13, 2014

(30) Foreign Application Priority Data
May 13, 2013 (FR) ..................................... 13 54250

(51) Int. Cl.
*F02P 5/00* (2006.01)
*F02N 11/08* (2006.01)
(Continued)

(52) U.S. Cl.
CPC ........ *F02N 11/0848* (2013.01); *F02D 19/061* (2013.01); *F02D 19/084* (2013.01);
(Continued)

(58) Field of Classification Search
CPC .. F02N 11/0848; F02P 5/1506; F02D 41/064; Y02T 10/46
(Continued)

(56) References Cited

U.S. PATENT DOCUMENTS

| 4,995,367 A * | 2/1991 | Yamauchi | F02D 41/0025 |
| | | | 123/1 A |
| 6,334,431 B1 * | 1/2002 | Kanehiro | F02P 5/045 |
| | | | 123/406.53 |

(Continued)

FOREIGN PATENT DOCUMENTS

| EP | 1 013 923 A2 | 6/2000 |
| FR | 2 910 075 A1 | 5/2009 |

(Continued)

OTHER PUBLICATIONS

French Search Report, dated Jan. 20, 2014, from corresponding FR application.

*Primary Examiner* — Mahmoud Gimie
*Assistant Examiner* — David Hamaoui
(74) *Attorney, Agent, or Firm* — Young & Thompson

(57) ABSTRACT

Method for cold starting an internal combustion engine operating with an ethanol fuel, with ignition controlled by a control unit including a basic ignition advance map determined for a given engine, includes the following steps applied to at least one combustion chamber in contact with a piston connected to a drive shaft:
 determining the engine temperature;
 rotating the drive shaft;
 phasing the engine;
 ensuring the fuel pressure exceeds a determined threshold for injection;
 injecting fuel for a first operational engine cycle after phasing;
 below a determined engine temperature, increasing, in the first operational cycle, the advance of the first ignition point before the compression top dead center for gases in the cylinder, with respect to the advance map, by a value between 21° and 50°;

(Continued)

Sole figure controlling a first ignition point according to advance map based on the cycle following the first cycle.

10 Claims, 1 Drawing Sheet

(51) Int. Cl.
*F02P 5/15* (2006.01)
*F02D 41/00* (2006.01)
*F02D 19/06* (2006.01)
*F02D 19/08* (2006.01)
*F02D 41/06* (2006.01)
*F02P 5/04* (2006.01)
*F02D 37/02* (2006.01)

(52) U.S. Cl.
CPC ........ *F02D 41/0025* (2013.01); *F02P 5/1506* (2013.01); *F02D 19/0689* (2013.01); *F02D 37/02* (2013.01); *F02D 41/064* (2013.01); *F02D 2041/0092* (2013.01); *F02D 2200/021* (2013.01); *F02D 2200/0602* (2013.01); *F02P 5/045* (2013.01); *Y02T 10/36* (2013.01); *Y02T 10/46* (2013.01)

(58) Field of Classification Search
USPC ............ 123/179.21, 406.19, 406.53, 406.55; 701/113
See application file for complete search history.

(56) References Cited

U.S. PATENT DOCUMENTS

| | | | | |
|---|---|---|---|---|
| 6,598,588 | B2* | 7/2003 | Yuya | F02P 5/14 123/179.5 |
| 7,395,794 | B2* | 7/2008 | Tamamoto | F02N 3/02 123/179.28 |
| 7,882,817 | B2* | 2/2011 | Yamazaki | F02N 3/02 123/185.2 |
| 8,056,536 | B2* | 11/2011 | Nakauchi | F02P 1/086 123/406.57 |
| 8,176,888 | B2* | 5/2012 | Reiche | F02D 41/0025 123/179.7 |
| 8,267,067 | B2* | 9/2012 | Reiche | F02P 5/1506 123/179.3 |
| 8,584,650 | B2* | 11/2013 | Peters | F02D 35/025 123/406.19 |
| 2012/0017873 | A1 | 1/2012 | Lunati et al. | |
| 2014/0196685 | A1* | 7/2014 | Ruhland | F02B 17/005 123/295 |
| 2015/0096535 | A1* | 4/2015 | Kitano | F02D 41/0097 123/406.53 |

FOREIGN PATENT DOCUMENTS

| | | |
|---|---|---|
| FR | 2 922 965 A1 | 5/2009 |
| JP | 2006 063857 A | 3/2006 |
| JP | 2010 133390 A | 6/2010 |
| WO | 99/10643 A1 | 3/1999 |

* cited by examiner

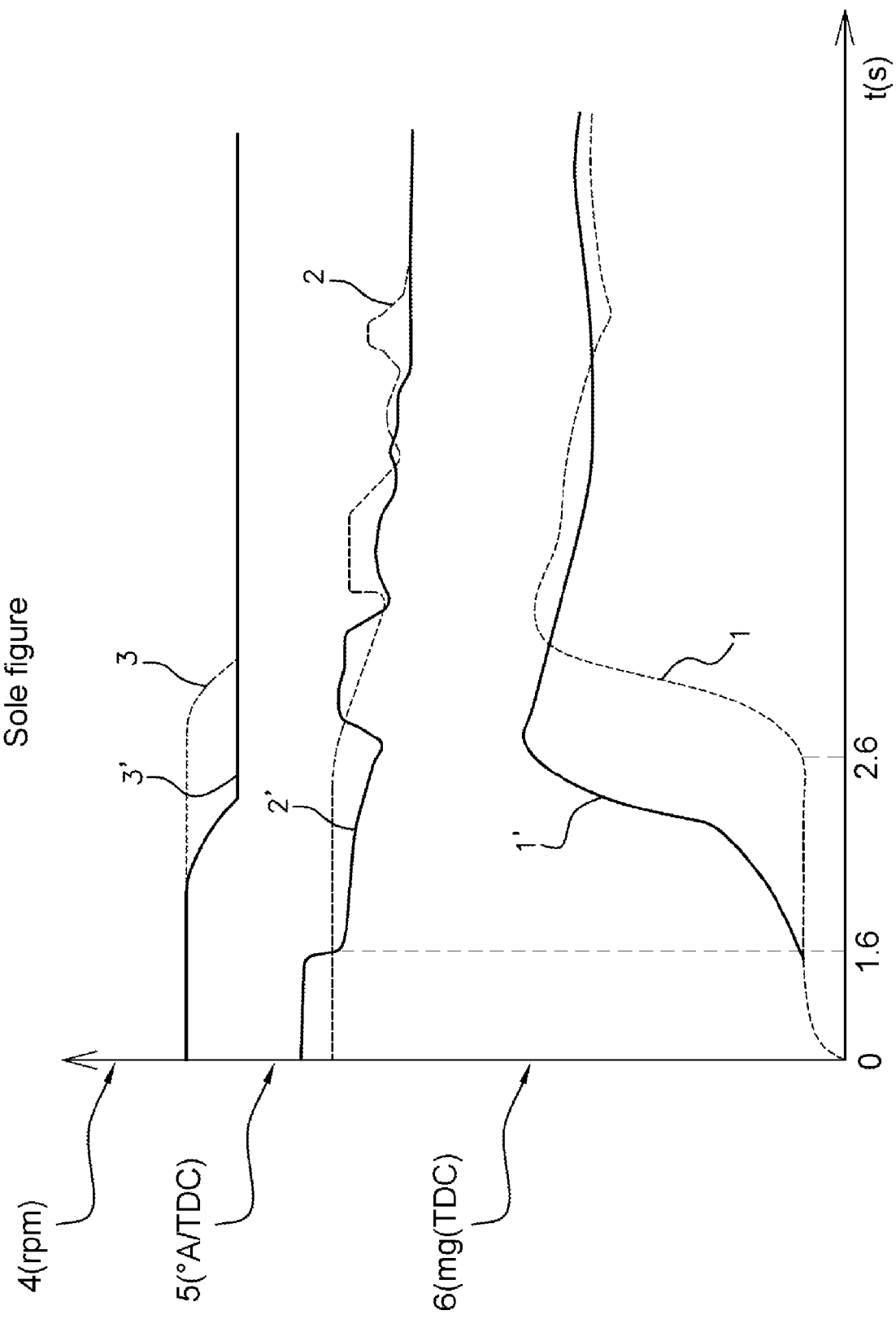
Sole figure

METHOD FOR COLD STARTING A SPARK-IGNITION INTERNAL COMBUSTION ENGINE OPERATING WITH A FUEL COMPRISING ETHANOL

FIELD OF THE INVENTION

The present invention relates to a method for cold starting an internal combustion engine operating with a fuel comprising ethanol, for example a fuel ranging from E100 fuel to E10 fuel, with ignition controlled by an engine control unit comprising a basic ignition advance map determined for a given engine operating point under standard pressure and atmospheric temperature and engine temperature conditions, comprising the following steps applied to at least one combustion chamber in contact with a piston connected to a drive shaft:

- determining the temperature of the engine coolant, also known as engine temperature,
- rotating the drive shaft by means of a starter,
- proceeding to the phasing of the engine by means of the engine control unit,
- checking that the pressure of the fuel exceeds a determined threshold for the purpose of injection,
- then injecting fuel for a first operational cycle of the engine following said phasing.

BACKGROUND OF THE INVENTION

In the naming of a fuel starting with the letter E, this letter denotes ethanol, and the number following the letter E denotes the percentage of ethanol in the mixture comprising substantially petrol and ethanol. The present invention relates to fuels comprising from 10 to 100% ethanol. A fuel E0 does not comprise ethanol.

The phasing or synchronization of the engine consists of determining, during the procedure of starting the engine from the stop thereof, the position of the crankshaft in the cycle of the engine so as to be able to inject fuel as early as possible into the cylinders during the starting of the engine, in synchronization with the progression of the engine cycles. This phasing is performed in a known manner by the engine control unit by means of a position sensor of the crankshaft and/or of the camshaft(s). With some position sensors, the engine control unit may lose the position of the crankshaft when it stops, causing alternating rotary movements before a complete halt, and has to perform this phasing with each starting process. As soon as the phasing has been performed, the engine control unit knows the position of the pistons in the engine cycle, and in particular knows if a piston is in an intake or power phase for the same 360° modulo position of the crankshaft. Once phasing has been performed, and a fuel pressure threshold has been reached, the engine control unit allows the injection controller to inject fuel into the cylinders. The first operational cycle of the engine is that which immediately follows the phasing of the engine and the establishment of a suitable fuel pressure, in which an injection of fuel and identified ignition in the engine cycle are possible.

Ethanol is a fuel which evaporates with greater difficulty than petrol, particularly at cold temperatures. Petrol has a rate of evaporation that is progressive in accordance with temperature, and has a rate of evaporation not equal to zero at low temperature, however this rate is not high. Ethanol behaves very differently and evaporates substantially instantaneously and completely (in a proportion of approximately 99%) at a temperature of approximately 78° C. and at a pressure of approximately 100 Kpa, and thus has a rate of evaporation of substantially zero below this temperature for the same pressure. The greater the rate of evaporation of the fuel, the more effective is the combustion of the gas in the combustion chamber. The greater the proportion of ethanol in the fuel mixture, the slower is the development of the flame front. Thus, the greater the proportion of ethanol in the fuel, the greater are the difficulties encountered when starting the engine, these difficulties being manifested in particular by increased starting times.

Some car manufacturers enforce maximum starting times conditional on the engine temperature at the moment of starting, that is to say the time that passes between switching on the starter and the driving of the engine, or more specifically of the drive shaft or crankshaft in the case of a reciprocating engine, by means of the combustion energy of the mixture in the cylinders for a given temperature or a given temperature range. These starting times may be between 1.5 and 2.5 seconds for example for a fuel E100 at the same temperature.

It is thus necessary to provide specific devices or methods for reducing the starting time of engines using such fuels, more specifically at low temperatures.

The prior art teaches a number of techniques for facilitating cold starting and thus reducing the starting time of engines operating with such fuels.

For example, a technique consisting of adding an additional petrol tank to the vehicle is known, thus solving the problem posed by the increase of the starting time caused by the ethanol component in the fuel. However, such a solution is costly and complicated to implement and also requires an additional volume for housing the additional tank.

A solution consisting of reheating the fuel as it passes into the injectors before entering the combustion chambers is also known. This solution is also costly since it requires specific injectors and an additional consumption of electrical energy.

Other solutions consist of heating the engine block or the common injection rail where applicable. These solutions are also costly since they require expensive additional equipment.

Document EP 1 013 923 is known and describes a method for heating the engine in cold starting conditions. When determined cold starting conditions are confirmed, the ignition timing is advanced beyond the minimum spark advance for best torque by a determined corrective amount so as to facilitate or improve the heating of the engine coolant. This teaching is based on the heating of an engine that turns in steady state under determined engine temperature conditions and indicates that the temperature of the engine coolant rises with an increase of the ignition timing advance relative to the basic ignition advance conditions defined by the minimum advance for the purpose of obtaining the best torque.

A method for controlling the ignition of a combustion engine fed by a fuel containing ethanol, making it possible to overcome the "backfire" problem, is also known from document FR 2 922 965. The "backfire" is the result of an abnormal combustion detonating pre-mix gases inside the intake conduit with a flame still present inside the cylinder. The method according to this document defines a first mode of cold operation of the engine, in which the moment of an ignition step is determined, in a compression phase, by a first advance value with respect to the top dead center greater than a second advance value corresponding to the minimum advance making it possible to produce the maximum engine torque. This first advance value is greater than the second advance value from 1° to 20° of crankshaft rotation, and is lower than a third advance value producing an engine torque equal to 50% of the maximum engine torque. The objective of the over-advance in this document is therefore to initiate combustion earlier in the compression phase so as to avoid the risk of very late combustion, lasting beyond the opening of the intake valves, without increasing either the consumption or polluting emissions of the engine, this over-advance producing an engine torque between 50% and 100% of the maximum engine torque, the method being suitable for an engine operating in the steady state, established while the temperature is below a threshold temperature.

SUMMARY OF THE INVENTION

One object of the present invention is to do away with the specific equipment of the prior art as described above for engines operating with such fuels and referred to as direct injection engines.

A further object of the present invention is to reduce the starting time with such equipment for engines operating with indirect injection in the intake manifold.

More specifically, the present invention relates to a method for cold starting an internal combustion engine operating with a fuel comprising ethanol, with ignition controlled by an engine control unit comprising a basic ignition advance map determined for a given engine operating point under standard pressure and atmospheric temperature and engine temperature conditions, comprising the following steps applied to at least one combustion chamber in contact with a piston connected to a drive shaft:

determining the temperature of the engine coolant, also known as engine temperature, rotating the drive shaft by means of a starter, proceeding to the phasing of the engine by means of the engine control unit, checking that the pressure of the fuel exceeds a determined threshold for the purpose of injection, then injecting fuel for a first operational cycle of the engine following said phasing, characterized in that said method further comprises the following steps:

below a determined engine temperature, increasing, in said first operational cycle of the engine, the advance of the first ignition point before the compression top dead center for the gases present in the combustion chamber, with respect to said basic ignition advance map recorded in the engine control unit, by a value between 21° and 50° so as to produce a temperature rise in the chamber with a minimum engine torque, controlling a first ignition point according to said basic ignition advance map, based on the operational cycle of the engine in said at least one combustion chamber, following said first operational cycle of the engine, for which an acceleration or a speed of the drive shaft beyond a determined threshold is exceeded, or for which a determined number of combustion top dead centers is reached.

The present invention consists of initiating in the first cycle(s) of the engine which is/are operational after the phasing of the engine, before the engine starts, that is to say before the drive shaft is driven by the energy of the combustion(s) in the cylinder(s), one or more ignitions in at least one combustion chamber with a very significant advance with respect to the compression top dead center so as to reheat the gaseous mixture present in the cylinder so that it reaches its evaporation temperature more quickly. This focus in accordance with the invention on a very early ignition in order to improve the cold starting is surprising and goes against a widely accepted concept consisting, by contrast, in delaying the ignition so that the ignition takes place at the moment at which the mixture is hottest, due to the very low evaporation rate at low temperature for such a fuel comprising ethanol. The first ignition point is thus implemented at a pressure of the gases in the cylinder sufficiently low such that the force produced by the combustion occurs just after the compression top dead center, taking into the account the slow speed of propagation of the flame front. The present invention thus advantageously utilizes the property of slow combustion of ethanol at low temperature. From the first operational cycle of the engine during starting, the method according to the invention thus makes it possible to produce a temperature rise in the chamber with a minimum torque, improving the evaporation of the mixture over the first cycle and the following cycle(s). In any case, this minimum torque is less than 50% of the maximum engine torque, which is the given engine torque for an ignition advance corresponding to the basic ignition advance map determined for a given engine operating point.

An ignition advance between 0 and 15° before the compression top dead center is currently used in a very conventional manner for fuels of the type comprising ethanol. Depending on the engines, ignition advances ranging up to 20° or 25° before the compression top dead center are encountered for these same fuels. For the present invention, it is considered that the ignition advance zone between the compression top dead centre of the piston and 30° therebefore is the normal ignition advance zone usable and used conventionally for the purpose of normal combustion of the air/fuel mixture in the combustion chamber in accordance with said basic ignition advance map determined for a given engine operating point under standard pressure and atmospheric temperature and engine temperature conditions.

The early ignition advance, according to the invention, is cancelled as soon as a determined acceleration threshold of the drive shaft is identified by the ECU (engine control unit), this condition advantageously being estimated on the basis of the speed gradient of the drive shaft, itself calculated by means of the position sensor thereof. It is also possible to estimate the condition of cancellation of the anticipated advance in accordance with the invention on the basis of the drive shaft speed, that is to say when said drive shaft assumes a rotational speed greater than the speed at which the drive shaft is driven in rotation by the starter.

The end of the starting phase of the engine, when the combustions drive the drive shaft in rotation, and the subsequent stop of the very early ignition advance according to the invention is thus advantageously assessed by the engine control unit by means of a speed or acceleration threshold of the crankshaft. In fact, the engine control unit can calculate, in a known manner, the acceleration of the crankshaft by means of the position sensor thereof and can control the return of the first ignition point to a conventional advance in accordance with said basic ignition advance map implemented in the ECU, the starting procedure then having come to an end.

The expression "below a determined temperature of the engine" here means temperatures below 20° C. for an E100 fuel based on pure ethanol. This threshold temperature of 20° C. remains valid for all fuels that can be used for the present invention.

The determined threshold of the pressure of the fuel which must be exceeded is a conventional injection authorization threshold for the ECU, and is dependent on the engine.

The method according to the invention does not require any hardware in addition to that already existing in an engine, and can be implemented advantageously by means of a software which will be implemented in the engine control unit.

In accordance with an advantageous feature, before the step of controlling a first ignition point according to said basic ignition advance map, when an acceleration of the drive shaft beyond a determined threshold is exceeded or when a determined number of combustion top dead centers is reached, the method according to the invention additionally consists of increasing the advance of the first ignition point before the compression top dead centre for the gases present in the cylinder compared with said basic ignition advance map recorded in the engine control unit, in a second operational cycle of the engine subsequent to said first cycle, by a value between 21° and 50°, which is lower than the ignition advance before the compression top dead centre of the first ignition point of said first cycle.

This feature, insofar as the first operational cycle of the engine has not allowed a sufficiently effective combustion in the intended combustion chamber and a resultant starting of the engine, makes it possible to continue to apply a very early ignition advance in accordance with the invention for the following engine cycle in the same combustion chamber, but utilizing the reheating of the cylinder walls performed during the previous cycle (first cycle).

In accordance with an advantageous feature, before the step consisting of controlling a first ignition point according to said basic ignition advance map, when an acceleration of the drive shaft beyond a determined threshold is exceeded or when a determined number of combustion top dead centers has been reached, the method according to the invention consists of controlling a first ignition point of which the advance before the compression top dead centre is degressive, specifically from one operational cycle of the engine to the other and from said first operational cycle of the engine, until the engine is started.

This feature optimizes the starting procedure of the engine until the combustions drive the drive shaft in rotation with an engine temperature lower than 20° C., and in particular a very low temperature or a fuel comprising a very high proportion of ethanol, up to the fuel E100.

In accordance with an advantageous feature, the method according to the invention consists of controlling a plurality of ignition points in at least one same operational cycle of the engine, distributed successively in accordance with a phase advance having a value between 21° and 50° with respect to said basic ignition advance map recorded in the engine control unit.

In accordance with an advantageous feature, said advance phase of the first ignition point, for said first operational cycle of the engine at least, is approximately 52° before the compression top dead centre, for an engine temperature of approximately −5° C. for a fuel E100.

In accordance with an advantageous feature, the method according to the invention is applied to all combustion chambers of the engine.

In accordance with this feature, as soon as the phasing has been performed and the injection pressure reached, the engine control unit can advance the ignition in all the cylinders of the engine during the first operational engine cycle of each cylinder after the phasing. The starting of the engine will thus be accelerated.

The present invention also relates to an electronic engine control device comprising an engine control unit enabling implementation of a method according to the invention.

This device advantageously comprises the engine control unit implemented with a software performing the method as defined above.

BRIEF DESCRIPTION OF THE DRAWINGS

Further advantages and features will become clear upon reading hereinafter an exemplary embodiment of a method according to the invention accompanied by annexed drawings, given by way of non-limiting example.

The sole FIGURE shows a schematic graph of the development of three parameters during an exemplary starting of a vehicle having an internal combustion engine, comparing a starting method according to the prior art and a starting method according to the invention.

DETAILED DESCRIPTION OF THE INVENTION

The starting method shown by way of example in the sole FIGURE is a method for cold starting an internal combustion engine with direct injection into the combustion chambers, operating with a fuel comprising ethanol, in the example the fuel E100. The engine in the example is a spark-ignition engine of which the ignition is controlled by an engine control unit comprising, in a known manner, a basic ignition advance map determined for a given engine operating point under standard pressure and atmospheric temperature and engine temperature conditions.

The temperature of the engine coolant at the moment of starting is −5° C. This temperature is measured at the probe for measuring the temperature of the coolant and fitted on an engine in a known manner.

The starting method according to the invention is illustrated in the sole FIGURE by means of three curves 1', 2' and 3' in a solid line for the starting in accordance with the exemplary embodiment according to the invention, and by means of three curves 1, 2, 3 in dashed lines for the comparative example of starting in accordance with the prior art, all curves being illustrated synchronously with respect to the time t in seconds corresponding to the abscissa, over which the successive engine cycles progress. The ordinate axis in fact shows three different axes, allocated to the curves 1 and 1' (ordinate 4), 2 and 2' (ordinate 5), 3 and 3' (ordinate 6). These different ordinate axes correspond to the following parameters:

curve 1 and 1': speed of rotation of the drive shaft in revolutions per minute (rpm), measured, in the known manner, on the basis of the position sensor of the drive shaft fitted on an internal combustion engine and calculated by means of the ECU of the vehicle, curve 2 and 2': advance of the first ignition point in the engine cycle(s), in a combustion chamber, in degrees of advance with respect to the compression top dead centre (° A/TDC), controlled and applied by the ECU, curve 3 and 3': quantity of fuel consumed during the starting procedure, in milligrams per compression top dead centre (mg/TDC).

The illustrated method comprises the following steps, applied to at least one combustion chamber in contact with a piston connected to a drive shaft:

determining the temperature of the engine coolant, also known as the engine temperature, rotating the drive shaft by means of a starter, for example the electric starter associated with the engine, proceeding to the phasing of the engine by means of the engine control unit, checking that the pressure of the fuel exceeds a determined threshold for the purpose of injection, then injecting fuel into the combustion chamber for a first operational cycle of the engine following the phasing, following an angular condition or time window determined in a known manner in the case of direct injection, such that the quantity of injected fuel remains in the combustion chamber; it should be noted that, in the case of indirect injection, the fuel is injected into the intake manifold in accordance with any known method.

In accordance with the invention, the method then additionally comprises the following steps: below a determined engine temperature, for example −5° C. for a fuel E100, increasing, in the first operational cycle of the engine, the advance of the first ignition point before the compression top dead centre for the gases present in the combustion chamber or the cylinder with respect to the conventional basic ignition advance map recorded in the engine control unit, by a value of approximately 40°. This early advance in accordance with the invention, in the example, brings the first ignition point in the first operation cycle of the engine to an absolute advance of approximately 52° before the compression top dead centre as illustrated on the curve 2'. In the present example, an absolute advance up to 60° before the compression top dead centre can be envisaged. Generally, for a fuel E100, an absolute advance between 40° and 65° before the compression top dead centre, in accordance with the basic map and the engine temperature at the moment of starting, can be applied for the first operational cycle of the engine. A lesser absolute advance, before the compression top dead centre, preferably between 10° and 40°, can be applied for a fuel having a weaker ethanol content.

In the case of another example, that is to say 0° C. engine temperature before starting for the same fuel E100, an absolute advance of 50° before the compression top dead centre can be applied advantageously for the first ignition point.

In the example described on the basis of a direct injection engine, it should be noted that the step of injection of the fuel into the combustion chamber must be performed before the first early ignition point according to the invention. The result may thus be that the entire quantity of fuel provided by the calculator cannot be injected taking into account the provided early advance. In this case, the injection train provided by the engine control unit should be shifted, such that the last programmed injection is performed before the first early ignition point in accordance with the invention, taking into account the required angular margin where applicable.

The method according to the invention advantageously also consists in increasing the advance of the first ignition point before the compression top dead centre for the gases present in the cylinder with respect to the basic ignition advance map recorded in the engine control unit, in a second operational cycle of the engine successive to said first cycle, by a value between 21° and 50°, which is lower than the ignition advance before the compression top dead centre of the first ignition point of said first cycle, for example 5° to 6° lower. In the example, this would give an absolute advance of 47° before the top dead centre for an advance decrease of 5°. This is true to the extent that an acceleration or a speed of the drive shaft has not exceeded said determined threshold after the first operational cycle of the engine.

The method according to the invention preferably additionally consists of controlling a first ignition point, of which the advance before the compression top dead centre is degressive, specifically from one operational cycle of the engine to the other and from the first operational cycle of the engine until the engine is started, that is to say until the crankshaft is driven in rotation by the energy of the combustions.

The method according to the invention may consist in controlling a plurality of ignition points in the same first operational cycle of the engine, the ignition points being distributed successively in accordance with a phase advance having a value between 21° and 50° with respect to or additionally to the basic ignition advance map recorded in the engine control unit, that is to say for example four ignition points (not shown) in the same first engine cycle.

The method illustrated in the sole FIGURE then consists of controlling a first ignition point according to the basic ignition advance map based on the operational cycle of the engine in the combustion chamber in question following the first operational cycle of the engine, for which an acceleration of the drive shaft beyond a determined threshold is exceeded, or for which an engine speed threshold is exceeded, or for which a determined number of combustion top dead centers is reached. This threshold corresponds to the driving of the crankshaft by the energy of the combustions. In accordance with the curve 2' in the sole FIGURE, the anticipated advance according to the invention disappears when the engine has started, which would occur approximately at the time t=1.6 seconds.

It can be seen on the basis of the sole FIGURE and of the compared curves 1 and 1' that the engine starting with the method according to the invention described above is obtained approximately two seconds before the starting in accordance with the shown example of the prior art method, in which the engine starts approximately at the time t=2.6 seconds. As soon as the starting has been implemented in accordance with the curve 1', it can be seen that the ignition advance curve 2' falls below the ignition advance curve 2 according to the prior art, the basic ignition advance map implemented in the engine control unit taking over (see the significant difference along the abscissa of the two curves 2 and 2' by a value corresponding substantially to the time gained during the starting process).

The compared curves 3 and 3' of consumed quantities of fuel logically show a saving of fuel achieved with the described method corresponding to the time gained when starting of the engine.

The method described with the aid of the sole FIGURE is preferably (not illustrated) applied to all the combustion chambers of an engine when an ignition process has to be performed in a chamber before the starting of the engine or more specifically for example before an acceleration threshold of the drive shaft is exceeded.

The method according to the invention can be implemented in an engine control unit of the known type already having a basic ignition map by means of an additional software.

The invention claimed is:

1. A method for cold starting an internal combustion engine operating with a fuel comprising ethanol, the method comprising:

cold starting the internal combustion engine with the fuel comprising ethanol using an ignition controlled by an engine control unit comprising a basic ignition advance map determined for a given engine operating point under standard pressure and atmospheric temperature and engine temperature conditions, the engine having at least one combustion chamber in contact with a piston connected to a drive shaft, said cold starting using the fuel comprising ethanol comprising the following steps applied to the at least one combustion chamber in contact with the piston connected to the drive shaft during a cold start phase of the operating with the fuel comprising ethanol:
- determining the temperature of the engine coolant, the determined temperature of the engine coolant being the engine temperature,
- rotating the drive shaft using a starter,
- proceeding to phasing of the engine by means of the engine control unit,
- checking that a pressure of the fuel exceeds a determined threshold for a purpose of injection,
- then injecting the fuel for a first operational cycle of the engine following said phasing,
- below a determined engine temperature, increasing, in said first operational cycle of the engine, the advance of the first ignition point before the compression top dead center for gases present in the combustion chamber, with respect to said basic ignition advance map recorded in the engine control unit, by a value between 21° and 50° so as to produce a temperature rise in the chamber with a minimum engine torque, and
- while rotating the drive shaft using a starter, controlling a first ignition point according to said basic ignition advance map, based on the operational cycle of the engine in said at least one combustion chamber, following said first operational cycle of the engine, for which an acceleration or a speed of the drive shaft beyond a determined threshold is exceeded, or for which a determined number of combustion top dead centers is reached, wherein, before the step consisting of controlling a first ignition point according to said basic ignition advance map, when an acceleration of the drive shaft beyond a determined threshold is exceeded or when a determined number of combustion top dead centers is reached, the method additionally consists of increasing the advance of the first ignition point before the compression top dead center for the gases present in the cylinder with respect to said basic advance ignition map recorded in the engine control unit, in a second operational cycle of the engine following said first cycle, by a value between 21° and 50°, which is lower than the ignition advance before the compression top dead center of the first ignition point of said first cycle.

2. The method according to claim 1, wherein, before the step consisting of controlling a first ignition point according to said basic ignition advance map, when an acceleration of the drive shaft beyond a determined threshold is exceeded or when a determined number of combustion top dead centers is reached, the method consists of controlling a first ignition point of which the advance before the compression top dead center is degressive, specifically from one operational cycle of the engine to the other and from said first operational cycle of the engine, until the engine is started.

3. The method according to claim 1, wherein each of a plurality of ignition points are controlled in at least one same operational cycle of the engine, such that each of said plurality of ignition points are distributed successively in accordance with a phase advance having a value between 21° and 50° with respect to said basic ignition advance map recorded in the engine control unit.

4. The method according to claim 1, wherein the phase advance of said first ignition point, for said first operational cycle of the engine at least, before the compression top dead center, is approximately 52° before the compression top dead center for an engine temperature of approximately −5° C. for a fuel E100.

5. The method according to claim 1, wherein the method is applied to all combustion chambers of the engine.

6. An electronic engine control device comprising an engine control unit enabling implementation of a method according to claim 1.

7. The method according to claim 1, further comprising controlling a plurality of ignition points in at least one same operational cycle of the engine, said ignition points being distributed successively in accordance with a phase advance having a value between 21° and 50° with respect to said basic ignition advance map recorded in the engine control unit.

8. The method according to claim 2, wherein the phase advance of said first ignition point, for said first operational cycle of the engine at least, before the compression top dead center, is approximately 52° before the compression top dead center for an engine temperature of approximately −5° C. for a fuel E100.

9. The method according to claim 2, wherein the method is applied to all combustion chambers of the engine.

10. An electronic engine control device comprising an engine control unit enabling implementation of a method according to claim 2.

* * * * *